(12) United States Patent
Clewits

(10) Patent No.: US 6,853,983 B1
(45) Date of Patent: Feb. 8, 2005

(54) SYSTEM AND METHOD FOR THE SELECTIVE ACTIVATION OF ONE OR SEVERAL SOFTWARE AND/OR HARDWARE FUNCTIONS OF A PROGRAMMABLE DEVICE

(75) Inventor: Ritske Clewits, Amsterdam (NL)

(73) Assignee: R. Clewits Beheer B.V., Amsterdam (NL)

( * ) Notice: Subject to any disclaimer, the term of this patent is extended or adjusted under 35 U.S.C. 154(b) by 0 days.

(21) Appl. No.: 09/319,071

(22) PCT Filed: Dec. 2, 1997

(86) PCT No.: PCT/NL97/00660
§ 371 (c)(1),
(2), (4) Date: Jul. 7, 1999

(87) PCT Pub. No.: WO98/25238
PCT Pub. Date: Jun. 11, 1998

(30) Foreign Application Priority Data

Dec. 2, 1996 (NL) .............................................. 1004658

(51) Int. Cl.$^7$ .............................................. G06F 17/60
(52) U.S. Cl. .............................. 705/41; 705/43; 705/52; 235/375; 235/381
(58) Field of Search ............................... 705/41, 52, 43, 705/39, 40; 235/375, 381, 379, 380

(56) References Cited

U.S. PATENT DOCUMENTS

| 5,006,698 | A | * | 4/1991 | Barakat | 235/382 |
|---|---|---|---|---|---|
| 5,438,184 | A | * | 8/1995 | Roberts et al. | 235/380 |
| 5,546,446 | A | * | 8/1996 | Tsunokawa et al. | 379/114.2 |
| 5,649,118 | A | * | 7/1997 | Carlisle et al. | 395/241 |
| 5,705,798 | A | * | 1/1998 | Tarbox | 235/379 |
| 5,844,218 | A | * | 12/1998 | Kawan et al. | 235/380 |
| 5,909,502 | A | * | 6/1999 | Mazur | 382/135 |
| 5,917,168 | A | * | 6/1999 | Nakamura et al. | 235/379 |
| 5,932,859 | A | * | 8/1999 | Ijichi et al. | 235/375 |
| 5,933,812 | A | * | 8/1999 | Meyer et al. | 705/15 |
| 6,003,767 | A | * | 12/1999 | Hayashida | 705/40 |
| RE37,067 | E | * | 2/2001 | Feiken | 235/380 |

FOREIGN PATENT DOCUMENTS

WO    WO 96/17316    *  6/1996    ......... G06F/157/00

OTHER PUBLICATIONS

Farrell, J.J., III; Smartcards become an international technology, TRON Project International Symposium, 1996. TEPS '96, 1996 Page(s): 134–140.*

* cited by examiner

Primary Examiner—Jagdish N Patel
(74) Attorney, Agent, or Firm—Young & Thompson

(57) ABSTRACT

A system and method for the selective activation of one or several software and/or hardware functions of a programmable device. A program selectively activates one of the functions of the programmable device. The program is coupled to an information carrier and deducts a value of the activated function from a value previously stored in the carrier.

7 Claims, 2 Drawing Sheets

SYSTEM AND METHOD FOR THE SELECTIVE ACTIVATION OF ONE OR SEVERAL SOFTWARE AND/OR HARDWARE FUNCTIONS OF A PROGRAMMABLE DEVICE

BACKGROUND OF THE INVENTION

The invention relates to a system for the selective activation of one or several software and/or hardware functions of a programmable device, comprising at least temporarily a programmable device and programming means.

The invention also relates to a method of selectively activating one or several software and/or hardware functions of a programmable device whereby at least one function is selected and activated.

Such a system and such a method are known and are used for simplifying the production of programmable devices. Only one type of device is produced instead of individual devices for each application and/or each wish of an end user. The device is then adapted to the wishes or demands of the end user in that functions are selectively activated in the device. It is thus possible to manufacture a wide range of devices in a uniform production process, each having its own specific price level.

A disadvantage of such a system is that it is up to the manufacturer himself to carry out the necessary programming so as to adapt the device to the end user's specific wishes, which may indeed not be known to the manufacturer in some cases. This is because a wholesale firm is often involved, with an intermediary salesman who is more or less far removed from the manufacturer maintaining the contact with the end user.

It is accordingly advisable to leave the programming to the relevant intermediary, but this renders it impossible for the manufacturer to see how many devices are programmed, and how many functions therein.

The manufacturer thus does not know what amount is due to him as payment for the activated functions.

SUMMARY OF THE INVENTION

The invention has for its object to eliminate the above disadvantages. According to the invention, a system is for this purpose characterized in that the system at least temporarily also comprises reading means which are designed for reading an electronically readable information carrier comprising a programmable memory capable of containing a numerical value.

The electronically readable information carrier, for example a chip card, is provided with a certain credit amount and is delivered by the manufacturer to, for example, an intermediate trader, and paid for by the latter. Whenever a function is activated, a corresponding amount is subtracted from the credit amount on the electronically readable information carrier. The intermediate trader programs the programmable device in accordance with the end user's wishes and buys a fresh electronically readable information carrier from the manufacturer after the full credit amount has been written off this carrier, or has the carrier reprogrammed at the manufacturer's, so that the latter is always paid for the activated functions. An additional advantage for the end user is that he will only pay for functions actually activated and not for any functions not (yet) activated, while still retaining the possibility of having additional functions activated later. This enables the manufacturer to keep an eye on the activated functions without the necessity of programming the programmable devices himself or of activating the functions desired by the end user. The manufacturer as it were provides the end user with a software licensing card for all functions present on the programmable device, a certain value being debited to the card's account whenever one or several functions is or are activated.

EP-A-0 594 493 describes a method and a computer system for obtaining software by means of a microcomputer. The system for this purpose comprises a database in which the software to be used is stored and a detachable storage carrier which contains an access right. This latter carrier can be inserted into a reading device of the microcomputer for enabling a loading of software, for which the carrier contains the relevant access rights, from the database to the microcomputer. The carrier may also contain rights for implementing the loaded software.

EP-A-0 530 601 describes the use of data carrier cards which enable an activation of individual appliance functions of an electronic appliance. The electronic appliance here comprises a circuit arrangement with one or several circuits for putting into action a number of functions of the appliance. The functions to be carried out by the circuit arrangement can be activated by means of the data carrier card.

A major difference between the latter two systems and the system according to the present invention is that said latter two systems use configuration cards which are adapted to the specific wishes of the end user. These cards are capable of activating certain, predetermined functions of the programmable device only. The cards have to be specially manufactured for the end user, which is labour-intensive. In the system according to the invention, on the other hand, an electronically readable information carrier is used which is capable of activating any function of the programmable device while at the same time debiting the card's account for the amount due.

A special embodiment of a system according to the invention is characterized in that the programmable device comprises the programming means and the reading means.

This means that the wholesaler only needs an electronically readable information carrier in order to program the programmable device in accordance with the end user's wishes.

In particular, the programmable device is an automatic payment machine.

Since an automatic payment machine comprises reading means, it is possible to activate or additionally activate one or several functions of the automatic payment machine, provided it is also fitted with programming means, by means of no more than an electronically readable information carrier.

A further special embodiment of system according to the invention is characterized in that the programmable device is coupled at least temporarily to separate programming means, which programming means comprise the reading means and, at least temporarily, the electronically readable information carrier.

If the programmable device does not comprise the programming means, it is favourable to accommodate these programming means together with the card reader means in one unit into which the wholesaler subsequently inserts the electronically readable information carrier for the purpose of programming.

A particular embodiment of a system according to the invention is characterized in that the programmable device is a timer.

Such a timer may be used, for example, with a suntanning couch, a shower at a camping, etc. More or fewer functions of the timer may be activated in dependence on the application. A timer for a shower, for example, is often of a simple construction and need only determine the maximum shower time and possibly the use per unit time, whereas a timer for a suntanning couch, for example, monitors a warming-up time, a suntanning time, and the total number of hours of operation. Thanks to the system according to the invention, it is now possible for the manufacturer to deliver the same timer to the two customer groups, possibly each at its own specific price, while nevertheless the customer pays only for the functions he actually obtains.

The invention also relates to a method of selectively activating one or several software and/or hardware functions of a programmable device whereby at least one function is selected and activated. This method is characterized in that the programmable device is at least temporarily coupled to programming means which arm coupled to reading means, and in that the reading means cooperate with an electronically readable information carrier on which a value is stored, while after the activation of a function a corresponding value is debited.

This method will usually be carried out by a wholesaler or intermediary who has bought the electronically readable information carrier from the manufacturer. It is also possible for a (large-scale) end user to carry out the programming himself after buying an electronically readable information carrier, a programmable device, and possibly programming means and reading means from the manufacturer. This constitutes an additional advantage of the system and the method according to the invention. The manufacturer can offer these facilities to major end users since the payment takes place on the basis of activated functions anyway.

The invention also relates to a programmable device, programming means, and an electronically readable information carrier for use in a system according to the invention.

The electronically readable information carrier may be, for example, a chip card which comprises a programmable memory capable of containing a numerical value. Besides a decrementable amount, the chip card comprises at least one program for activating a function of the programmable device.

BRIEF DESCRIPTION OF THE DRAWINGS

The invention will now be explained in more detail by way of example with reference to the accompanying drawing, in which.

DESCRIPTION OF THE PREFERRED EMBODIMENTS

Figure 1:
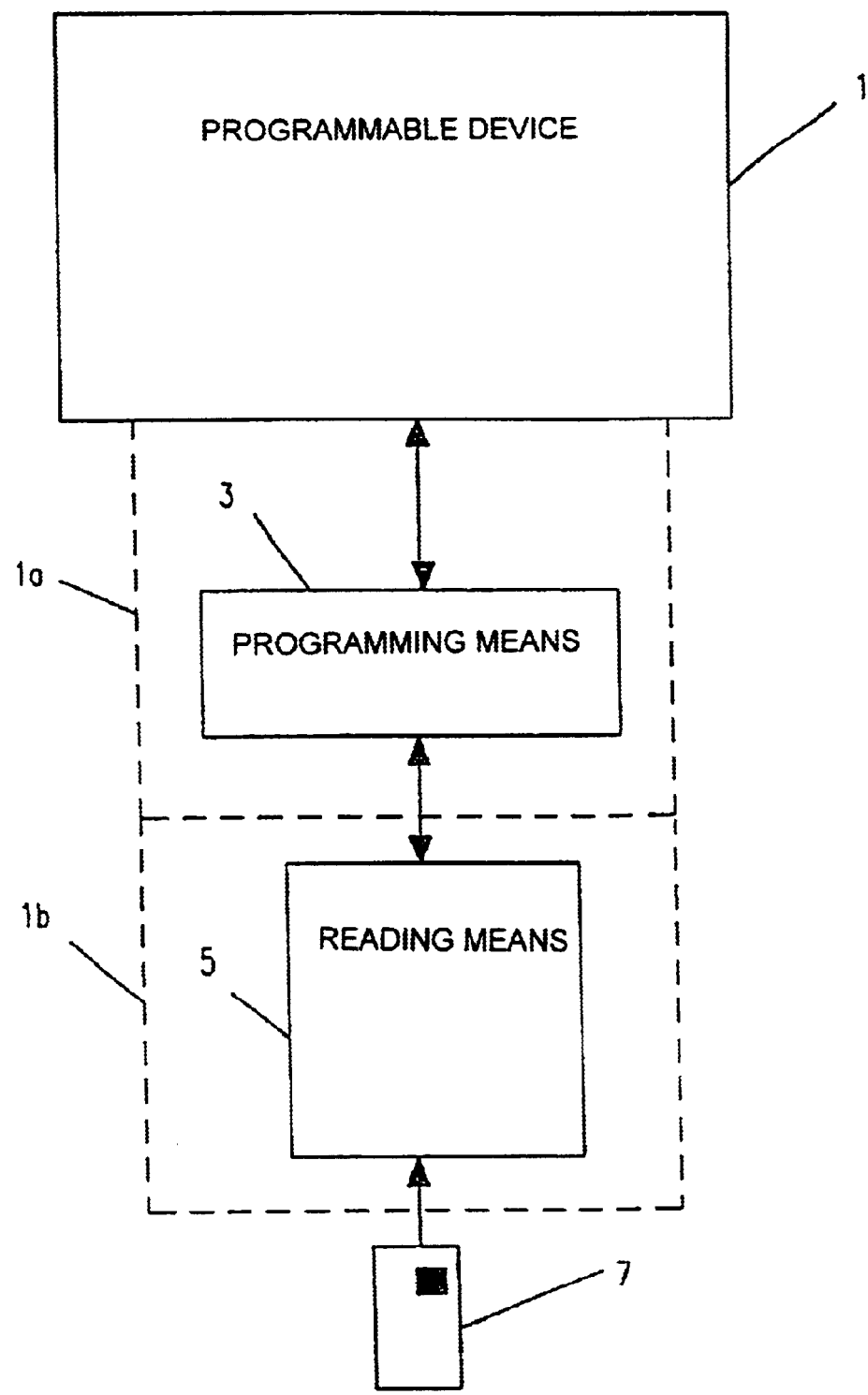
FIG. 1 diagrammatically shows an embodiment of a system according to the invention, and FIG. 2 diagrammatically shows an embodiment of a programmable device according to the invention in greater detail.

FIG. 1 diagrammatically shows an embodiment of a system according to the invention for the selective activation of one or several software and/or hardware functions of an electronic device. The system comprises a programmable device 1 which has been provided at the manufacturer's with any number of functions in the form of modules which might be desired by the end users. The modules, however, have not yet been activated, but they are activated on demand by the supplier (wholesaler) against payment.

The system further comprises programming means 3 which activate the desired module(s) of the programmable device 1. The programming means may be incorporated into the programmable device in some applications (referenced 1a).

The system finally comprises reading means 5 which in this embodiment are constructed as card reader means suitable for reading an electronically readable information carrier, for example a programmable card 7. The card reader means may also be incorporated into the programmable device in some applications (referenced 1b), for example in an automatic payment machine. The programmable card in this embodiment comprises a programmable memory capable of retaining a numerical value. During programming, i.e. selecting and activating, of the programmable device 1, the programmable card 7 is placed in the card reader means 5 which are coupled to the programming means 3.

To ensure that the manufacturer of the programmable device receives payment for the number of functions activated, the programmable card is issued by the manufacturer and provided with a certain credit amount. It is also stored on the card how much is to be debited from the amount for each function to be activated, which may be different for different functions. The wholesaler can now program each programmable device as desired by the end user and have this user pay for this. After the credit amount on the card has been used up, the user must either have the card recharged at the manufacturer's against payment, or buy a new card.

The programmable device 1 may be constructed, for example, at an automatic payment machine, for example for use in shops. More or fewer functions may be programmed in dependence on the end user's wishes. For example, the automatic payment machine may thus be made compatible with post giro cards, rechargeable cash cards, credit cards, etc.

The programmable device may alternatively be constructed, for example, as a timer for use with, for example, a shower, a suntanning couch, etc. The programmable device will usually not comprise the programming means in this application, and the timer will have to be programmed in accordance with the end user's wishes. A timer for a shower, for example on a camping, is usually of a simple construction and only determines the shower-taking time and possibly the use of the relevant shower (for example, per day, week, month, etc.). A timer for a suntanning installation in business surroundings, on the other band, is to monitor and/or register several time periods such as, for example, a warming-up time, an effective tanning time, and the number of hours of operation.

Figure 2:
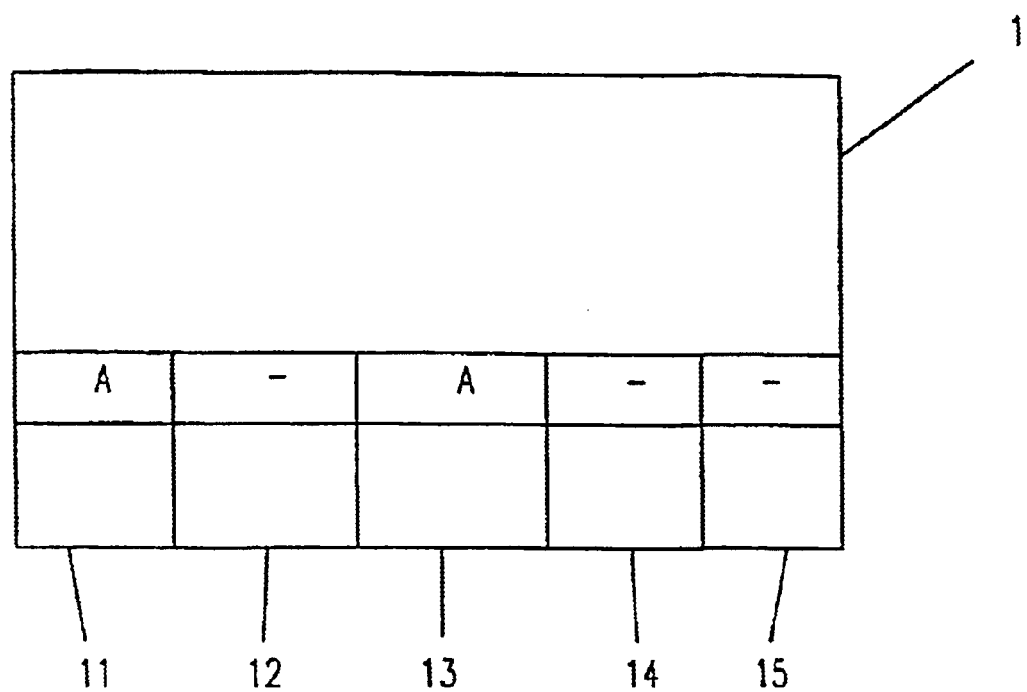

FIG. 2 diagrammatically shows an embodiment of a programmable device 1 in accordance with FIG. 1 in more detail. In this embodiment, the programmable device comprises five modules 11, 12, 13, 14, and 15 in which the respective functions are present. Each of these functions can be activated by the supplier, as desired, after payment by the end user. FIG. 2 shows that the modules 11 and 13 have been activated "A", and the modules 12, 14 and 15 have not.

It will be obvious that the system and the method according to the invention may be adapted in a variety of ways without departing from the scope of the invention. Thus the programming means and the (card) reading means may be integrated with the programmable device, as was noted above.

Furthermore, the electronically readable information carrier, for example a programmable card, may be adapted in various ways and may be constructed as a chip card, for example a rechargeable cash card or otherwise, as long as due payments are made to the manufacturer for the activated functions, i.e. it should not be possible to use a card not issued by the relevant manufacturer for activating a programmable device sold by this manufacturer.

It is also possible, for example, to rent out or lease the programmable devices, in which case the system according to the invention renders it possible not only to activate functions, but also to deactivate functions and to base the renting or leasing bill on the number of functions activated. It is in addition possible, for example, to deactivate a function by not debiting the card with a certain amount, or by debiting it with a lesser amount.

What is claimed is:

1. A system for selective purchase and activation of one or several software and/or hardware functions in a programmable device in which the functions are unavailable for use until purchased and activated, comprising:

reading means for receiving an electronically readable information carrier that includes a programmable memory having a numerical value stored therein; and programming means for modifying said numerical value in accordance with the previously unavailable functions that have been made available for use by being purchased and activated in the programmable device.

2. The system as claimed in claim 1, wherein the programmable device comprises the programming means and the reading means.

3. The system as claimed in claim 2, wherein the programmable device is an automatic payment machine.

4. The system as claimed in claim 1, wherein the programmable device is coupled at least temporarily to the programming means, which programming means comprise the reading means and, at least temporarily, the electronically readable information carrier.

5. A system for selective activation of one or several software and/or hardware functions in a programmable device, comprising:

reading means for receiving an electronically readable information carrier that includes a programmable memory having a numerical value stored therein, programming means for modifying the numerical value in accordance with the functions activated in the programmable device, wherein the programmable device is coupled at least temporarily to the programming means, the programming means comprising the reading means and, at least temporarily, the electronically readable information carrier, and wherein the programmable device is a timer.

6. A method of activating a function of a programmable device having plural functions that are unavailable for use until being selectively purchased and activated, the method comprising the steps of:

electronically reading an electronically readable information carrier on which a first value is stored;

coupling the programmable device having the plural functions that are unavailable for use until being selectively purchased and activated to a program capable of selectively purchasing and activating the plural functions;

selecting at least one of the plural functions to be made available;

making available and activating the selected function;

coupling the program to the information carrier; and purchasing the activated function by debiting from the first value a second value of the activated function.

7. The method as claimed in claim 6, wherein the programmable device is one of an automatic payment machine and a timer.

* * * * *